(12) United States Patent
Yoshida

(10) Patent No.: US 6,839,310 B2
(45) Date of Patent: Jan. 4, 2005

(54) OPTICAL DISK DRIVE HAVING OPTICAL POWER CONTROL

(75) Inventor: Koji Yoshida, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 537 days.

(21) Appl. No.: 10/074,352

(22) Filed: Feb. 12, 2002

(65) Prior Publication Data

US 2002/0122359 A1 Sep. 5, 2002

(30) Foreign Application Priority Data

Feb. 14, 2001 (JP) ........................................ 2001-036551

(51) Int. Cl.[7] .............................................. G11B 7/00
(52) U.S. Cl. .................. 369/47.53; 369/53.11; 369/59.11
(58) Field of Search ............................ 369/44.25, 44.26, 369/44.27, 47.1, 47.5, 47.51, 47.53, 47.55, 53.1, 53.11, 53.2, 53.23, 53.28, 53.37, 53.45, 59.1, 59.11, 116

(56) References Cited

U.S. PATENT DOCUMENTS 6,067,284 A * 5/2000 Ikeda et al. ................. 369/116
6,687,194 B1 * 2/2004 Kobayashi et al. ......... 369/53.2

* cited by examiner

*Primary Examiner*—Muhammad Edun
(74) *Attorney, Agent, or Firm*—RatnerPrestia

(57) ABSTRACT

A optical disk drive determines an optimum radiating power of laser for recording data in accordance with an asymmetry value or amplitude of a read signal. The optical disk drive includes an offset controller for changing a focus offset of laser in a direction of an optical axis to a focal point on an optical disk, a pre-test data recorder for recording pre-test data in a trial write area provided on the optical disk with the laser having a power kept in constant while the focus offset is changed by the offset controller, an offset detector for detecting a focus offset that minimizes an asymmetry value of a read signal of the pre-test data, a power controller for recording an Optimum Power Control (OPC) test data in the trial write area while changing the power of the laser, and an OPC operator for determining an optimum power of the laser in accordance with an asymmetry value of a read signal of the OPC test data.

9 Claims, 10 Drawing Sheets

OPTICAL DISK DRIVE HAVING OPTICAL POWER CONTROL

FIELD OF THE INVENTION

The present invention relates to an optical disk drive having a function of setting laser diode (LD) power (laser radiation power) for recording on a Compact Disc-Recordable (CD-R), write-once recording media, and a Compact Disc-Re-writable (CD-RW), re-writable recording media.

BACKGROUND OF THE INVENTION

Recently, optical disk drives such as audio compact disk (CD) and the like are actively used increasingly in the range of applications and improved in performance. Compact Disc-Read Only Memory (CD-ROM) and Digital Versatile Disc-Read Only Memory (DVD-ROM) have been already put into practical use. The market of optical disk drive capable of recording on CD-R media and CD-RW media has been rapidly expanding in recent years.

In optical disk drive capable of recording on the CD-R media and CD-RW media, the recording condition of an optimum LD power is determined through trial writing which is generally executed in a trial-writing area (Power Calibration Area: PCA) previously provided on the media. Under the recording condition obtained from the result of the trial writing, data is recorded in a data area of the optical disk. A method of obtaining the optimum LD power through the trial writing in the PCA is called Optimum Power Control (OPC). The principle of the OPC will be described below with reference to the drawing.

FIG. 7 shows the relationship between the LD power for recording on the optical disk in a conventional optical disk drive, and an asymmetry value and amplitude of a read signal.

In FIG. 7, the horizontal axis represents the LD power for recording on the CD-R media and CD-RW media, and the vertical axis represents the asymmetry value of the read signal read out of the CD-R media and the amplitude of the read signal read out of the CD-RW media. Also, a plot H shows the relationship between the LD power for recording on the CD-R media, write-once media, and the asymmetry value of a read signal. A plot I shows the relationship between the LD power for recording on the CD-RW media, re-writable media, and the amplitude of read signal.

As shown in FIG. 7, in the CD-R media, according to an increase of the LD power for data recording, the asymmetry value of the read signal read out of the data decreases. In CD-RW media, according to an increase of the LD power for data recording, the amplitude of the read signal read out of the data increases. This indicates that the LD power for recording on the CD-R media correlates a lot with the symmetry value of the read signal, and that the LD power for recording on the CD-RW media correlates a lot with the amplitude of the read signal.

The conventional optical disk drive with such characteristics previously stores the asymmetry value or amplitude of the read signal as a target performance, and switch the LD power in multiple stages in the PCA of the optical disk in order to record OPC test data. Then the drive reads the OPC test data recorded at each LD power for each multiple stage. The drive executes the OPC through controlling the LD power so that the asymmetry value of the read signal detected by an asymmetry value detector for the write-once CD-R media may be consistent with the stored target performance, and that the amplitude of the read signal detected by an amplitude detector for the re-writable CD-RW media may be consistent with the target performance.

The PCA and a method for the OPC described above are prescribed in the Compact Disc Recordable Standards (Orange Book Standards) of Phillips Co. and Sony Corporation.

In the Orange Book standards, a single optical disk has up to 99 recordable tracks. Correspondingly to this, the optical disk has the PCA for maximum 100 times recording exceeding the maximum number of tracks. Thus, the OPC can be executed maximum 100 times according to the standards.

FIG. 8 is the configuration diagram of the PCA mentioned in the Orange Book standards. The optical disk includes a PCA 26, the area for executing the OPC. The PCA 26 is divided into a test area 27 for recording the test data corresponding to the changed LD power in multiple stages, and a count area 28 indicating the number of tests.

The PCA 26 is allotted with an area for 100 times tests on the optical disk, and a single-trial write area 27 includes 15 absolute time in pre-groove (ATIP) frames, and a count area 28 for a single-trial includes a single ATIP frame.

A recording speed of the recordable optical disk drive has increased year after year, the optimum LD power is required to increase for recording on the optical disk. The relationship between the recording speed and optimum LD power for recording will be described below.

FIG. 9 shows the relationship between the recording speed onto the write-once CD-R media and the LD power required for recording in the conventional optical disk drive. In FIG. 9, the horizontal axis represents the recording speed of the optical disk drive, and the vertical axis represents the LD power required for achieving the recording speed.

As shown in FIG. 9, in the write-once CD-R media, the required LD power is 15 mW for a fourfold speed, while the power is 21 mW for an eightfold speed, and is 26 mW for a 12-fold speef. Further, for a 16-fold speed in the future, the required LD power is about 30 mW. The LD power is the value of laser light emitted from an object lens toward the optical disk. The optical path from the semiconductor laser to the object lens exhibits a loss at approximately 30% place due to optical components such as collimator lens and riser lens. Therefore, the LD power emitted from the semiconductor laser is generally required to be about 3.33 times the LD power emitted from the object lens, that is, the required LD power output is about 100 mW for the recording at the 16-fold speed. And a high-output semiconductor laser is accordingly needed.

The LD power required for recording is affected by a focus offset of the object lens. Alteration of the LD power required for recording in relation to the focus offset will be described below. The focus offset is expressed by a value relative to an amplitude of a focus error signal detected by a focus error signal detector.

FIG. 10 shows the relationship between the focus offset of object lens and the LD power in the write-once CD-R media. In FIG. 10, a recording is executed at a eightfold speed while maintaining the asymmetry value of the read signal in constant. FIG. 10 also shows the relationship between the focus offset of object lens and the LD power for the write-once CD-R media for each of five conventional optical disk drives, where the same mark corresponds with the same optical disk drive.

In FIG. 10, the horizontal axis represents the focus offset. The offset being zero indicates in-focus, the offset being positive indicates that the object lens is too close to the optical disk, and the offset being negative indicates that the object lens is apart from the optical disk. The vertical axis represents the LD power at which the asymmetry value after the recording of the write-once CD-R media is maintained in constant. The constant asymmetry value of the read signal after recording indicates that a pit formed on the optical disk has a constant length. The low recording power with which the asymmetry value after recording of the write-once CD-R media becomes constant indicates that the power required for recording can be reduced. A recording accuracy can be improved through making the asymmetry value nearly zero.

As shown in FIG. 10, when the focus offset is zero, the LD power required for recording is not always at the lowest value. This is caused by astigmatism generated in the semiconductor laser and the object lens. The astigmatism makes a laser spot collected through the object lens has respective different shapes on the optical disk and a photo sensor for detecting a reflected light of the laser. The laser output, upon being capable of reaching enough maximum power, solves such problem of focal deflection through increasing for the recording. Even if the spot shape of laser light on the optical disk is expanded due to the focal deflection, and even if the pit is not formed accurately, the drive increases the LD power to reduce the lowering of recording accuracy.

However, a high-speed optical disk drive based on the conventional system requires a high-output semiconductor laser. Such conventional drive has a problem such that increasing the LD power in order to make the asymmetry value of the read signal nearly zero to improve the recording accuracy shortens the life time of the semiconductor laser or increases a consumed current in the optical disk drive due to an increased current of driving the semiconductor laser.

SUMMARY OF THE INVENTION

An optical disk drive reduces an optimum LD radiating power for recording at a low level in consideration to an optimum focus offset for recording. The optical disk drive includes an offset controller for changing a focus offset of laser in a direction of an optical axis to a focal point on an optical disk, a pre-test data recorder for recording pre-test data in a trial write area provided on the optical disk with the laser having a power kept in constant while the focus offset is changed by the offset controller, an offset detector for detecting a focus offset that minimizes an asymmetry value of a read signal of the pre-test data, a power controller for recording an Optimum Power Control (OPC) test data in the trial write area while changing the power of the laser, and an OPC operator for determining an optimum power of the laser in accordance with an asymmetry value of a read signal of the OPC test data.

DESCRIPTION OF THE PREFERRED EMBODIMENT (Exemplary Embodiment 1)

Figure 1:
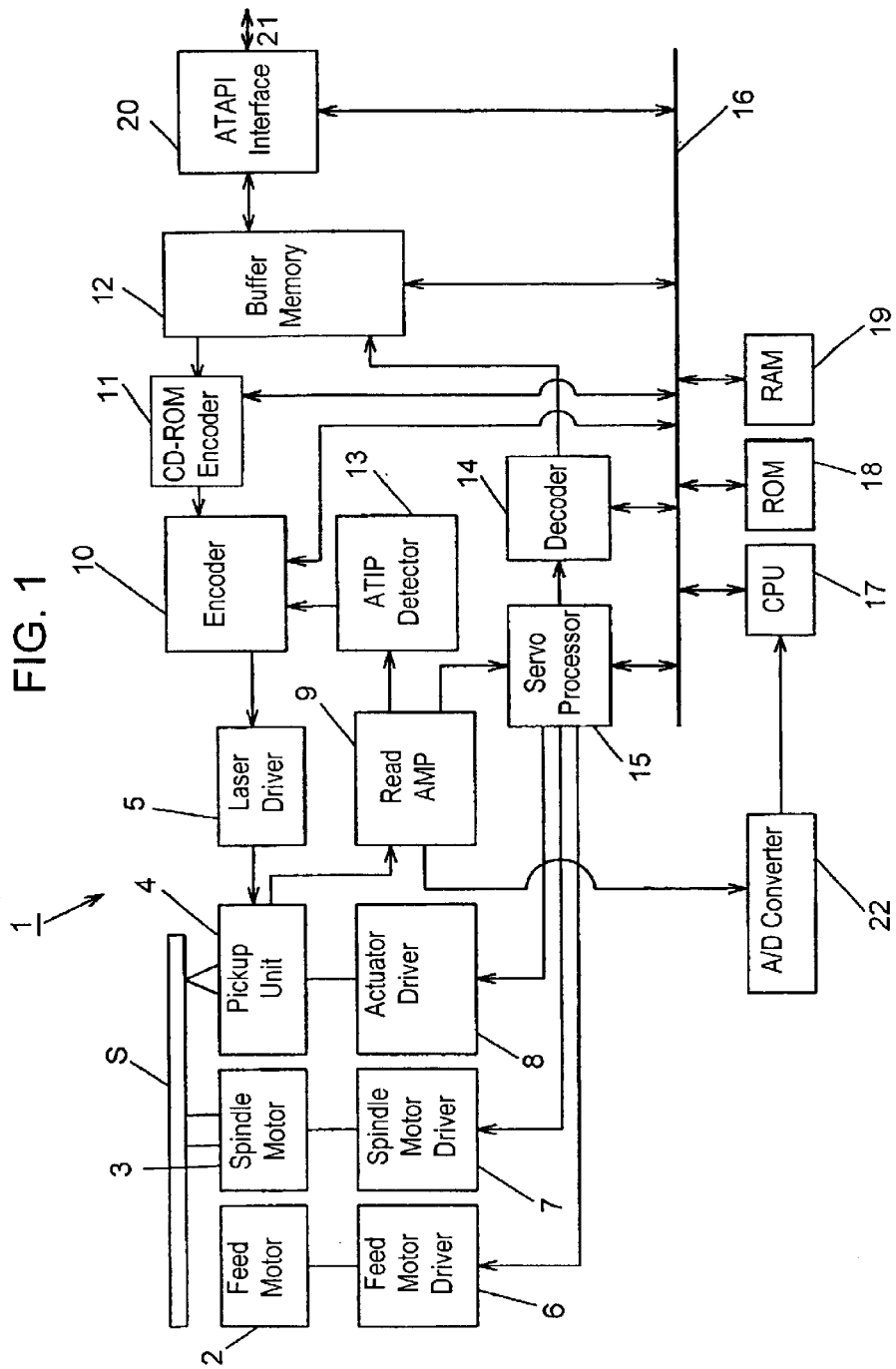
FIG. 1 is a block diagram of an optical disk drive according to exemplary embodiment 1 of the present invention.

FIG. 1 is a block diagram of an optical disk drive according to exemplary embodiment 1. In FIG. 1, optical disk drive 1 includes a feed motor 2 for moving a pickup unit 4 described later, a spindle motor 3 for rotating an optical disk S, an optical storage medium, and the pickup unit 4 for reading data. A laser driver 5 for driving a semiconductor laser 4a described later is built in the pickup unit 4. The feed motor 2 is driven by a feed motor driver 6, the spindle motor 3 is driven by a spindle motor driver 7, and an actuator 4e (described later) disposed in the pickup unit 4 is driven by an actuator driver 8.

A read amplifier 9 processes an electric signal obtained from the pickup unit 4. An encoder 10 controls the laser driver 5, and a CD-ROM encoder 11 encodes data. A buffer memory 12 stores data to be recorded and data demodulated by a decoder 14 described later. An Absolute Time In Pre-Groove (ATIP) detector 13 accepts a signal from the read amplifier 9, and the decoder 14 demodulates the signal. A servo processor 15 for servo control, a CPU 17 for logical decision and operation, and a ROM 18 having a program storage area storing a control program for the optical disk drive are all connected to a system bus 16.

A main memory 19 is used as a storage area for controlling, and also as a storage area for various recording control and reading control. An ATAPI interface 20, an interface with An Integrated Drive Electronics (IDE) bus 21 described later, is connected to the IDE bus 21 that communicates with a host computer (not shown). An A/D converter 22 analog-to-digital(A/D)-converts a signal which is received from the pickup unit 4 and processed in the read amplifier 9.

The CD-ROM encoder 11 obtains data to be recorded from the buffer memory 12 storing the data, and encodes the data for being recorded, and then inputs the encoded data to the encoder 10. The A/D converter 22 A/D-converts a top level, bottom level, and DC level of a read signal detected with the read amplifier 9, and outputs the converted data to the CPU 17.

Figure 2:
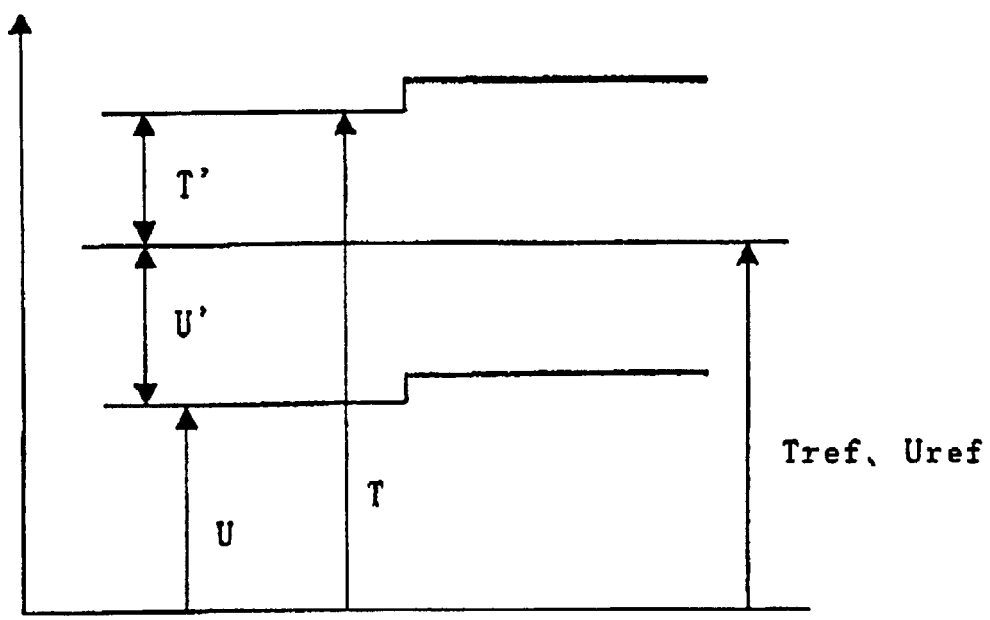
FIG. 2 shows detected waveforms of top level and bottom level in the optical disk drive according to embodiment 1.

FIG. 2 shows detected waveforms of the top level and bottom level. In FIG. 2, the top level (T) and bottom level (U) are detected from the read signal AC-coupled in the read amplifier 9, and inputted to the A/D converter 22.

The CPU 17 calculates an asymmetry value and an amplitude of the read signal based on the top level, bottom level and DC level of the A/D-converted read signal. The top level of read signal is denoted by "T", the bottom level is denoted by "U", and the respective reference levels of the level T and level U are denoted by "Tref" and "Uref". The levels Tref and Uref are the top level and bottom level when there is no read signal, and are reference voltages for detecting the top level and bottom level. Similarly to the top level T and bottom level U, The levels Tref and Uref are inputted to the CPU 17 through the A/D converter 22.

A method for calculating the asymmetry value and amplitude of the read signal will be described below with reference to the drawings. A level T' is the top level against the reference level, and is calculated by the equation:

$$T'=T-Tref.$$

Also, a level U' is the bottom level against the reference level, and is calculated by the equation:

$$U'=Uref-U.$$

The asymmetry value of read signal is calculated by the following equation:

$$\{-(T'-U')/(T'+U')\}\times 100(\%)$$

The amplitude of the read signal is calculated by the following equation:

$$T'+U'(V).$$

The optical disk drive according to embodiment 1 includes an offset controller, a pre-test data recorder, an offset detector, and an Optimum Power Control (OPC) operator. The offset controller gradually changes a focus offset gradually from an FO initial value to an FO final value by a FO step through inputting a control signal from the CPU 17 to the servo processor 15 through the system bus 16. The pre-test data recorder, controlling the laser driver 5 via the offset controller, the system bus 16 and the encoder 10, sets the LD power to a predetermined value and then records pre-test data while the offset controller changes the focus offset gradually. The offset detector calculates the focus offset from a focus error signal input from the read amplifier 9. The OPC operator executes an OPC based on the focus offset detected by the offset detector from the read pre-test data.

Figure 3:
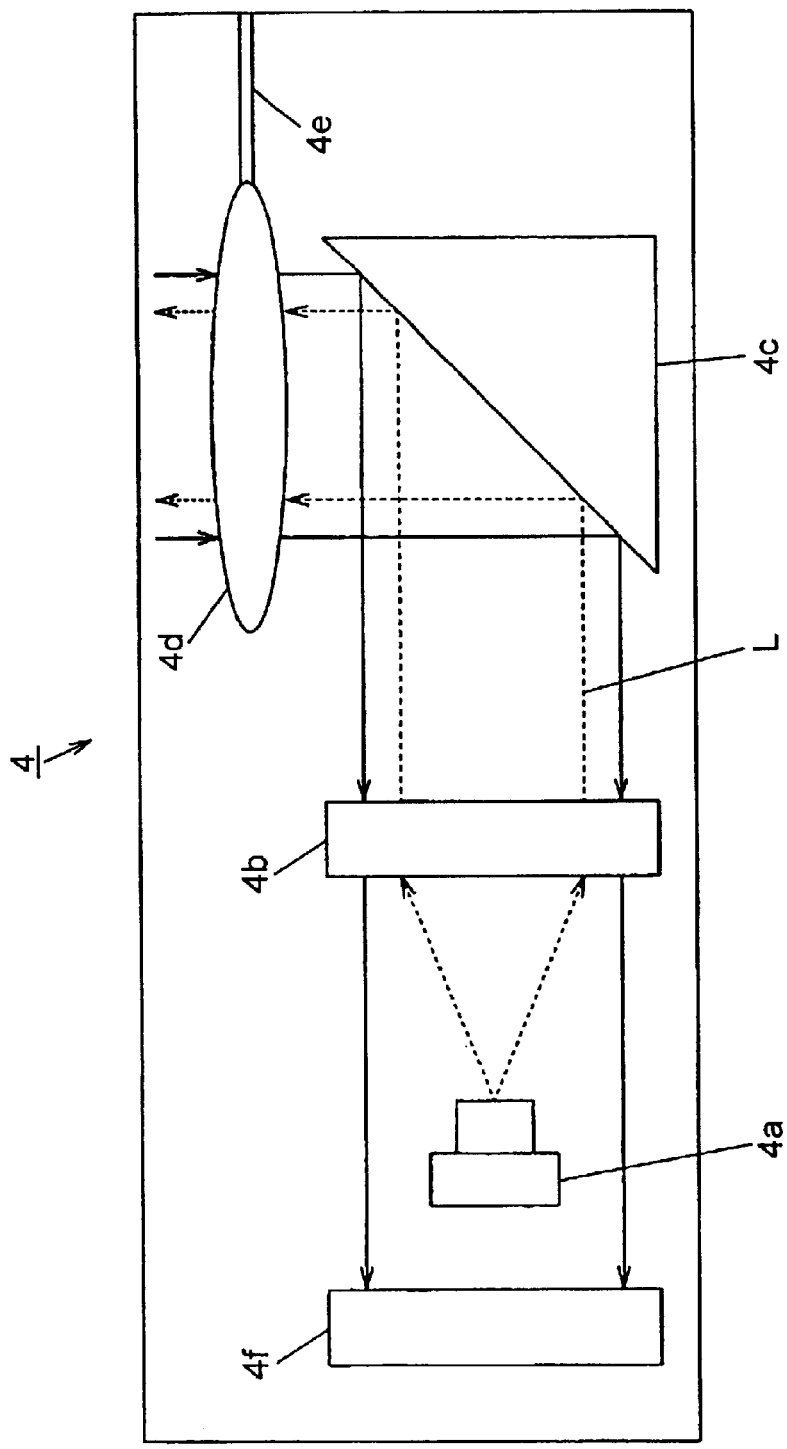
FIG. 3 is a configuration diagram of an optical pickup of the optical disk drive according to embodiment 1.

FIG. 3 is a configuration diagram of the pickup unit of the optical disk drive according to embodiment 1 of the present invention. In FIG. 3, the pickup unit 4 includes a semiconductor laser 4a as an optical source, a collimator lens 4b for forming laser L emitted from the semiconductor laser 4a to parallel ray, a rising mirror 4c for totally reflecting the laser L, an object lens 4d for collecting the laser L onto an optical disk S, an actuator 4e for supporting the object lens 4d, and a photo sensor 4f for detecting a reflected laser from the optical disk S.

The object lens 4d, which is supported by the actuator 4e, driven up-and-downward against the surface of the optical disk by the focus controller in the actuator driver 8, and driven radially against the optical disk by a tracking controller in the actuator driver 8. The photo sensor 4f converts the reflected laser to an electric signal and inputs the signal to the read amplifier 9. Then, the pickup unit 4 is driven radially against the optical disk S by the feed motor 2.

An operation of the optical disk drive according to embodiment 1 having the configuration as described above will be described below with reference to FIG. 1. First, the operation of recording data on the optical disk S will be described. The semiconductor laser 4a on the pickup unit 4 is driven by the laser driver 5 controlled by the encoder 10. In recording, data from the host computer is received with the ATAPI interface 20 and stored in the buffer memory 12. Then, the data is demodulated in the encoder 10 and inputted to the laser driver 5 as a signal for driving the semiconductor laser 4a.

In order to determine a drive current for the semiconductor laser 4a, an LD-power-setting voltage from a D/A converter (not shown) is inputted to the laser driver 5. With the drive signal from the encoder 10 and the LD-power-setting voltage from the D/A converter, the laser driver 5 drives the semiconductor laser 4a according to a predetermined current pattern. The LD power can be changed in multiple stages by changing the LD-power-setting voltage from the D/A converter in multiple stages. The laser L emitted from the semiconductor laser 4a is formed to parallel by the collimator lens 4b. Further, the laser L enters into the object lens 4d through the rising mirror 4c and is subsequently radiated onto the optical disk S for recording data.

Then, an operation for reading data from optical disk S will be described. The laser L emitted from the semiconductor laser 4a is formed in paralleled by the collimator lens 4b. Further, the laser L enters into the object lens 4d through the rising mirror 4c and is subsequently radiated onto the optical disk S. The laser L radiated onto the optical disk S is reflected at the optical disk S, and enters onto the photo sensor 4f in the pickup unit 4. The reflected laser is converted to an electric signal by the photo sensor 4f and is transmitted to the read amplifier 9. The read amplifier 9 detects a focus error signal and tracking error signal for the optical disk S according to the read signal.

The servo processor 15 uses the focus error signal and tracking error signal as feedback signals for servo-controlling the feed motor driver 6, spindle motor driver 7, and actuator driver 8. In the servo control, an focus offset (focal misalignment) in the optical axis direction and tracking direction is corrected based on the focus error signal and tracking error signal, so that laser L can be correctly radiated onto predetermined positions of the optical disk S. The actuator driver 8, which includes a focus controller and tracking controller, drives the actuator 4e through feeding back the signal for moving the object lens 4d in the optical axis direction and tracking direction for the servo control. In recording, the read amplifier 9 is also used as an offset detector for detecting the focus offset during a recording of the pre-test data on the trial write area.

A read signal obtained from pickup unit 4 is processed in the read amplifier 9 in order to detect the focus error signal and tracking error signal which in turn becomes the feedback signal to the servo processor 15. Simultaneously, the read signal becomes a signal input into the ATIP detector 13, and an output signal of the ATIP detector 13 is fed back to the encoder 10. A CD-ROM decoder 14 demodulates the signal and uses an output signal of the servo processor 15 to demodulate data, and the resultant data is stored in the buffer memory 12. The buffer memory 12 temporarily stores the demodulated data and recorded data. The data is transmitted to and from the host computer through the IDE bus 21 via the ATAPI interface 20.

Figure 4:
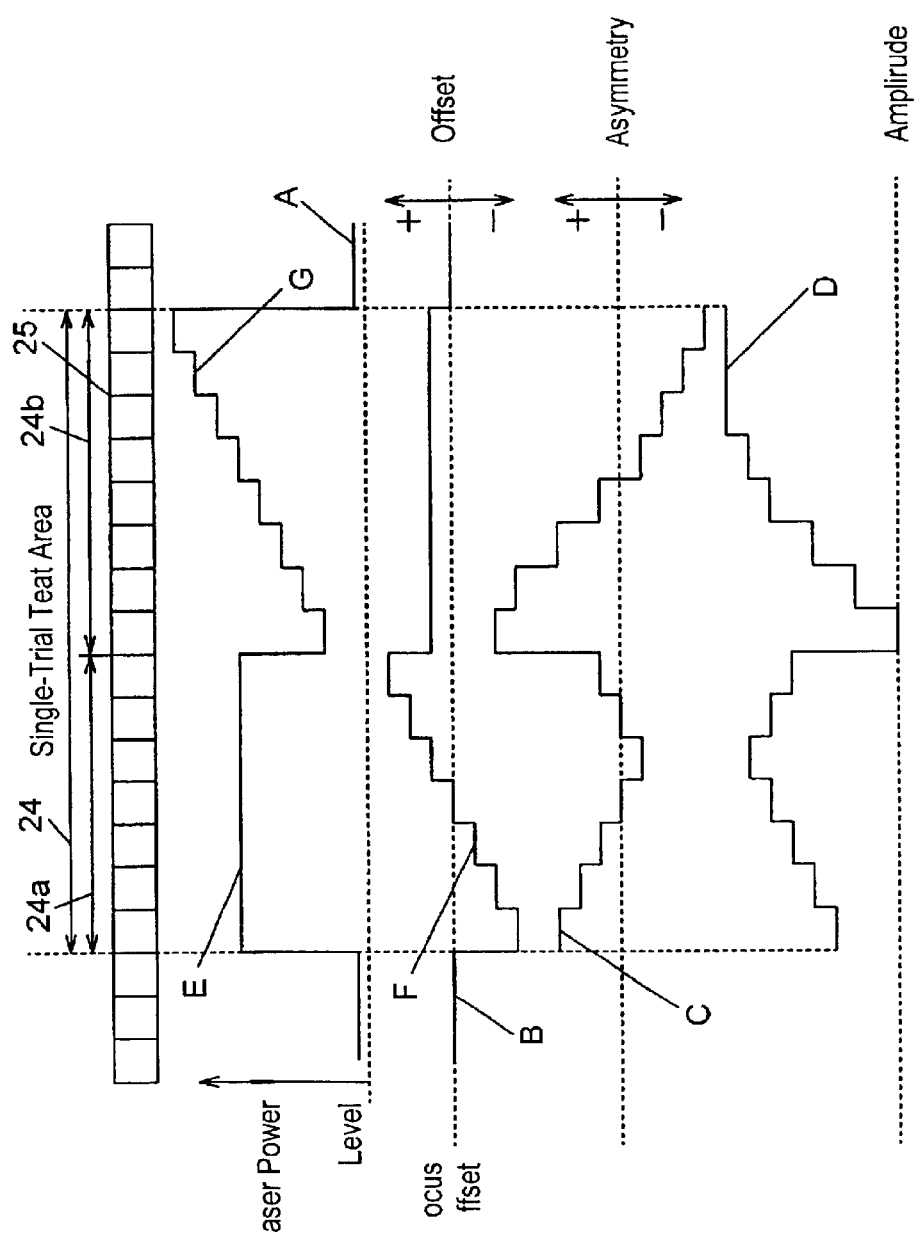
FIG. 4 shows a PCA used in the optical disk drive according to embodiment 1.

FIG. 4 is a diagram of a Power Calibration Area (PCA), the trial write area on the optical disk for the optical disk drive according to embodiment 1. In FIG. 4, a single-trial write test area 24 in the PCA is divided into a pre-test data recording area 24a for recording the pre-test data, and a pre-test data recording area 24b for performing the OPC. An ATIP frame 25 corresponds to the test area 24 for a single test for the OPC. A plot A shows an alteration of the LD power in the test area 24 for the single test for the OPC. A plot B shows an alteration of the focus offset against the LD power. A plot C shows an alteration of the asymmetry value of the signal read out of data recorded in the test area 24 in a write-once CD-R media. A plot D shows an amplitude of the signal read out against the LD power of a re-writable CD-RW media.

In the teat area 24a, as shown as a plot E, the test data is recorded with a constant LD power, but as shown by a plot F, the focus offset changes every ATIP frame 25. On the other hand, in the test area 24b, as shown by a plot G, the LD power changes every ATIP frame 25 during recording the test data. At that time, the focus offset is constant.

The optical disk drive according to embodiment 1 detects the focus offset that minimizes the asymmetry value during recording the data on the write-once CD-R media. The optical disk drive detects the focus offset that maximizes the amplitude of the read signal during recording the data on the re-writable CD-RW media. Therefore, for example, the data recorded with the focus offset changed gradually in the test area 24a is read out. Then, in the write-once CD-R media, as shown by the portion, of the plot C, corresponding to the area 24a, the asymmetry value of the read signal changes in accordance with the focus offset for recording. In re-writable CD-RW media, as shown by a portion, of the plot D, corresponding to the area 24a, the amplitude of the read signal changes in accordance with the focus offset for recording.

Figure 7:
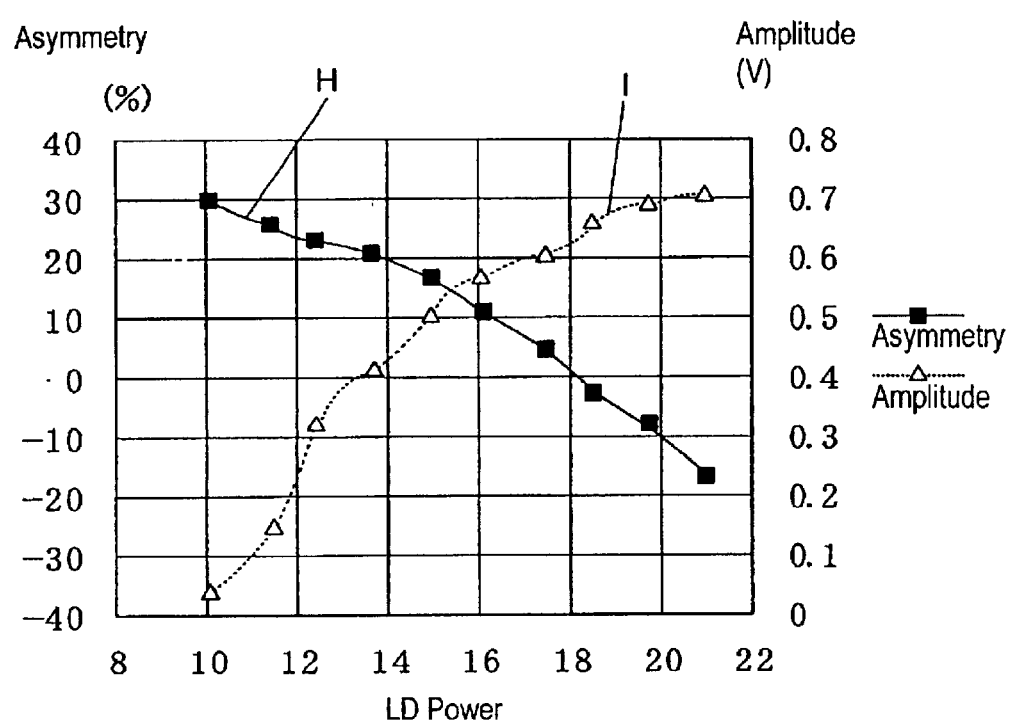
FIG. 7 shows the relationship between the LD power for recording data on an optical disk of a conventional optical disk drive, an asymmetry value and an amplitude of a read signal of the data.
Figure 8:
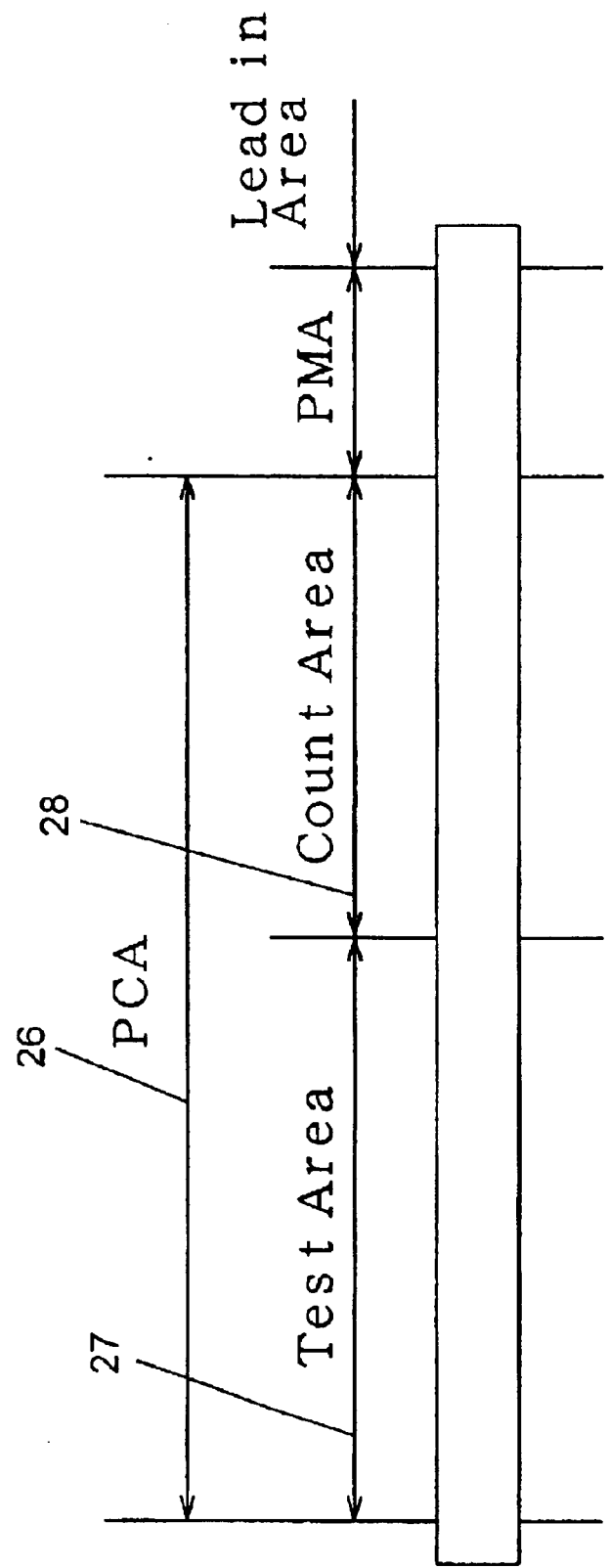
FIG. 8 is a configuration diagram of a PCA mentioned in the Orange Book standards.
Figure 9:
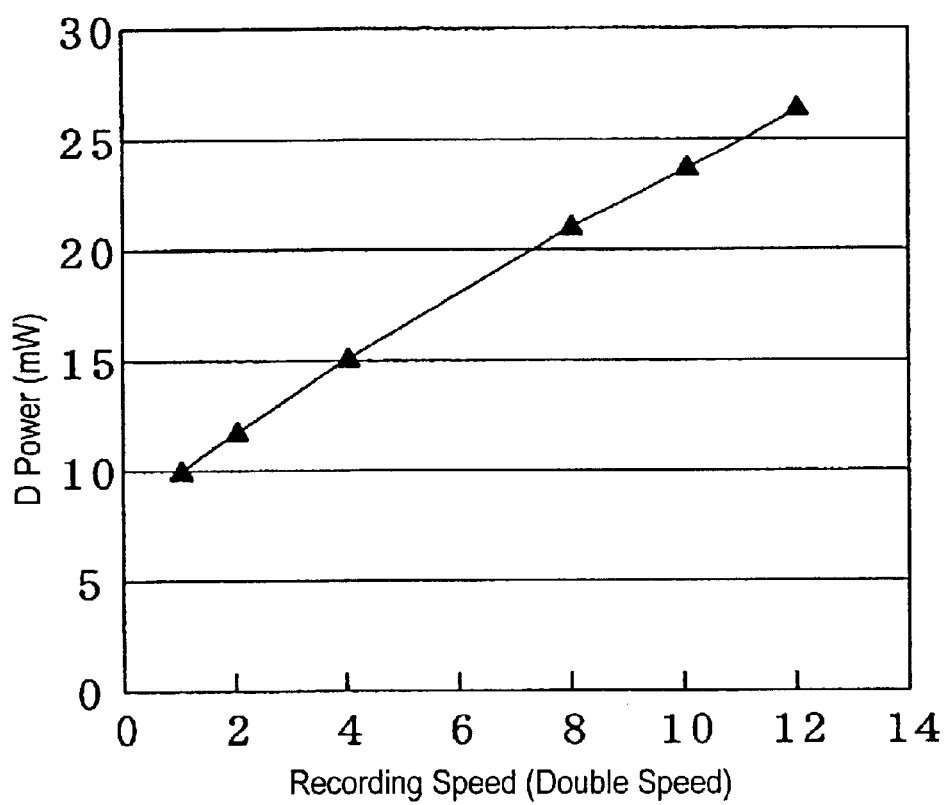
FIG. 9 show the relationship between a recording speed on a write-once CD-R media and a LD power required for recording data in the conventional optical disk drive.
Figure 10:
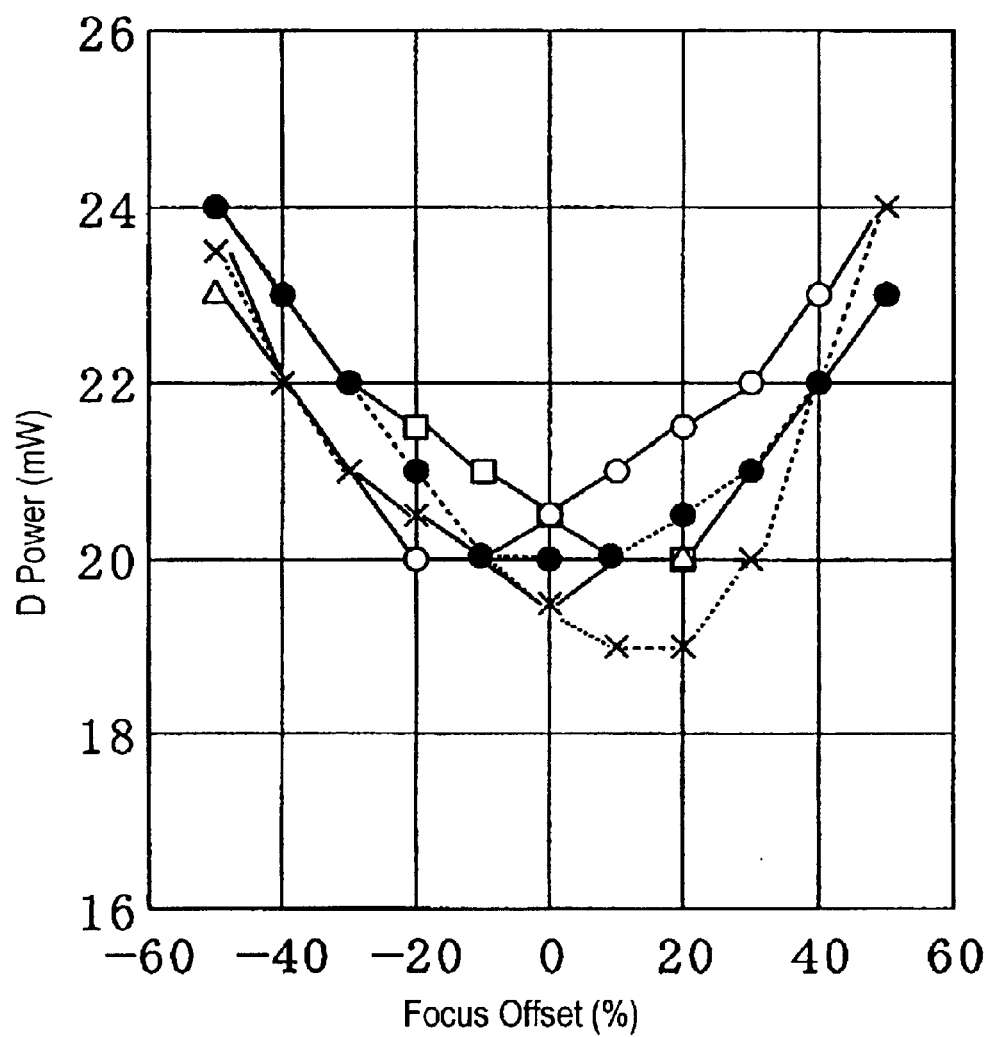
FIG. 10 shows the relationship between an object lens focus offset on optical disk surface and a LD power in the write-once CD-R media.

That is, in the test area 24a, since the data is recorded with the constant LD power at the ATIP frame 25 in which the asymmetry value of read signal is relatively minimum in the write-once CD-R media, as shown by a plot H in FIG. 7, the drive uses the LD power more efficiently than at the ATIP frame 25 in which the asymmetry value of the read signal is not minimum. Namely, the LD power is most efficiently used for recording data.

In the test area 24a, since the data is recorded with the constant LD power, at the ATIP frame 25 in which the amplitude of the read signal is relatively maximum in the re-writable CD-RW media, as shown by the plot I in FIG. 7, the drive uses the LD power more efficiently than at the ATIP frame 25 in which the amplitude of the read signal is not maximum. Namely, the LD power is most efficiently used for recording data.

That is, in the test area 24a, the ATIP frame in which the asymmetry value is relatively minimum in the write-once CD-R media and the ATIP frame in which the amplitude of the read signal is maximum in the rewritable CD-RW media are in the optimum status that the LD power is used most efficiently for recording data. Therefore, the spot shape of the laser on the optical disk is in an optimum status. Accordingly, the optimum focus offset for recording is obtained through determining the focus offset for recording with which the asymmetry value of the read signal in the write-once CD-R media is relatively minimum and through obtaining the amplitude of the read signal is maximum in the re-writable CD-RW media. In other words, the optimum focus offset for recording is detected in the test area 24a through detecting the focus offset for recording with which the asymmetry value of the read signal in the write-once CD-R media is relatively minimum and through detecting the amplitude of the read signal in the re-writable CD-RW media is maximum.

Figure 5:
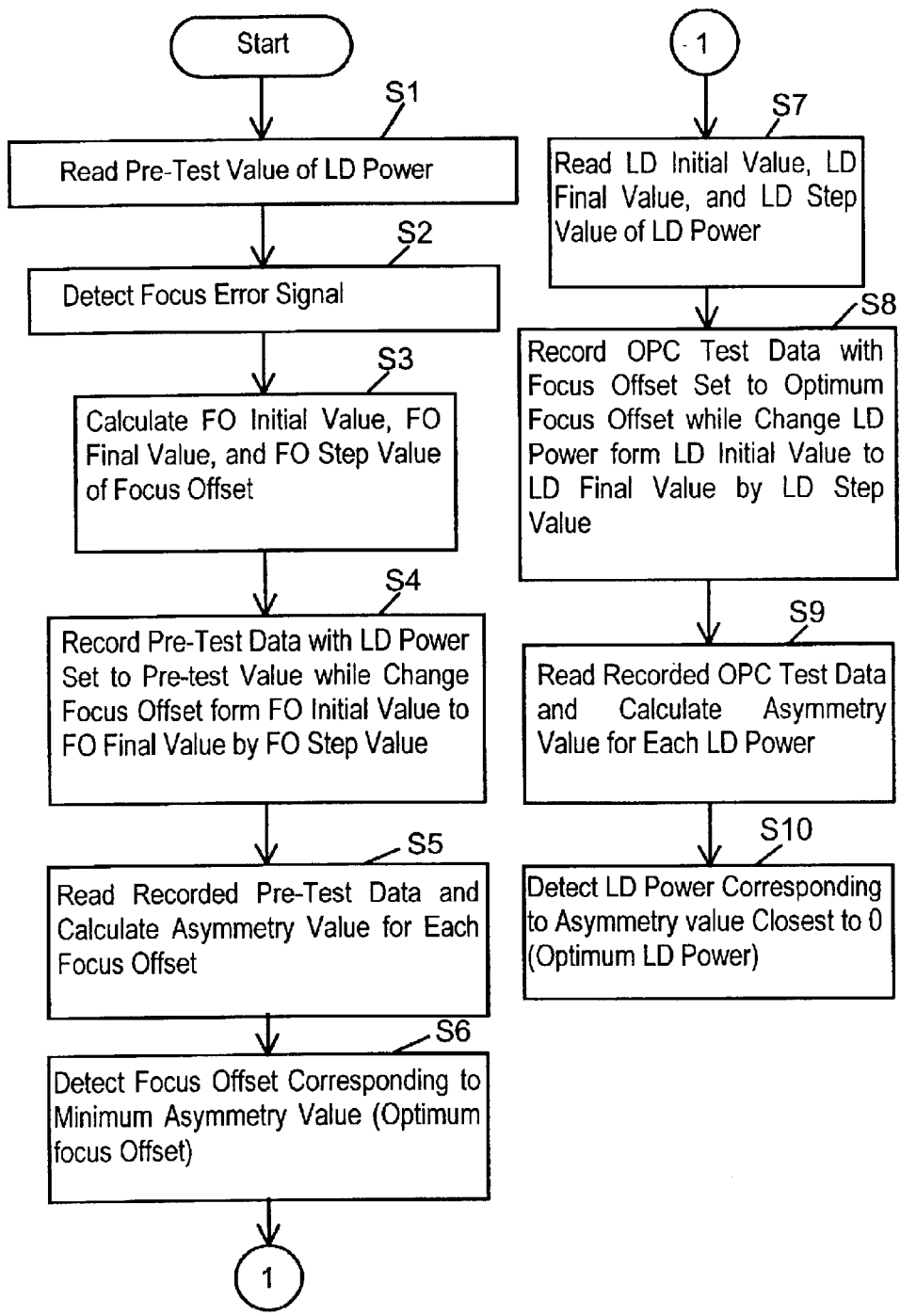
FIG. 5 is a flow chart showing a trial write operation of the optical disk drive according to embodiment 1.

When data is recorded on optical disk S, the trial write is executed before recording the data in order to determine the LD power for recording. A method of determining the LD power will be described below with reference to the drawings. In embodiment 1, the description will be given with respect to the trial write in accordance with the asymmetry value of the read signal for recording on the write-once CD-R media. FIG. 5 is a flow chart showing a trial write operation for the optical disk according to embodiment 1. First, a method of detecting the optimum focus offset after recording pre-test data will be described.

In FIG. 1 and FIG. 5, the CPU 17 reads a pre-test value of the LD power, previously stored in the memory 19, through system bus 16 (Step S1). Then, the read amplifier 9 detects the focus error signal according to the read signal detected by the pickup unit 4 (Step S2), and inputs the signal to the CPU 17 through the A/D converter 22. The CPU 17 detects the maximum focus offset corresponding to the amplitude from an input focus error signal, and calculates −50% of a maximum focus offset as a FO initial value and +50% of the maximum focus offset as a FO final value, and then calculates a FO step value in accordance with the FO initial value and the FO final value (Step S3). The focus offset exceeding the range from +50% to −50% of the maximum focus offset generally makes the servo control in the optical axis direction unstable, and may cause inaccurate servo control.

The CPU 17 controls the laser driver 5 via the system bus 16 and the encoder 10, and set the LD power to the pre-test value. Then, by controlling the servo processor 15 via the system bus 16, the CPU 17 gradually changes the focus offset from the FO initial value to the FO final value by the FO step value in order to record the pre-test data in the pre-test data recording area 24a (Step S4). At that time, as shown by the plot F, the focus offset changes every ATIP frame 25 for recording the data.

Then, the recorded pretest data is read out. The read amplifier 9 digitally converts the top level and the bottom level with the A/D converter 22, obtained by detecting the level of the read signal detected by the pickup unit 4, and inputs the data to the CPU 17. Then, the CPU 17 calculates the input top level and bottom level to obtain the asymmetry value and amplitude of the read signal for each focus offset gradually changed and recorded (Step S5). As shown in FIG. 4, according to the changing focus offset, the asymmetry value of the read signal changes in the write-once CD-R media, while the amplitude of the read signal changes in the re-writable CD-RW media. Then, the CPU 17 detects the focus offset (optimum focus offset) that minimizes the asymmetry value of the read signal (Step S6).

As described above, the optimum focus offset is detected before the OPC is executed by the OPC operator. Then, with the optimum focus offset, the OPC is executed by the OPC operator. An operation of the OPC is described below with reference to the drawings. The CPU 17 reads a LD initial value, LD final value, and LD step value of the LD power, previously stored in the memory 19, through the system bus 16 (Step S7).

The focus offset is set to the optimum focus offset detected by the offset controller at Step S6 in FIG. 5. Then, while the LD power is gradually changed by the OPC operator from the LD initial value to the LD final value by the LD power step value, OPC test data is recorded in the OPC-test-data-recording area 24b (Step S8). At that time, as shown by the plot G, the LD power is changed every ATIP frame 25 for recording the data.

Then, the recorded OPC test data is read. The read amplifier 9 digital-converts the top level and bottom levels, with the A/D converter 22, obtained by detecting the level of the read signal detected by the pickup unit 4, and inputs the data to the CPU 17. Then, the CPU 17 calculates the asymmetry value and the amplitude of the read signal for each LD power gradually changed from the input top level and bottom level (step S9). The CPU 17 detects the LD power (optimum LD power) that minimizes the asymmetry value of the read signal (Step S10).

As described above, the OPC is executed, and the optimum LD power is detected. The detected optimum focus offset and optimum LD power are used for actually recording data onto the optical disk. For the trial write for recording data onto the re-writable CD-RW media, the amplitude of the read signal is detected in Step S5 and Step S9 in FIG. 5. The focus offset for the maximum amplitude is detected in Step S6, and the LD power for the maximum amplitude is then detected in Step S10. For other steps, the optimum LD power is detected in the same manner as that for the write-once CD-R media.

COMPARATIVE EXAMPLE 1

Figure 6:
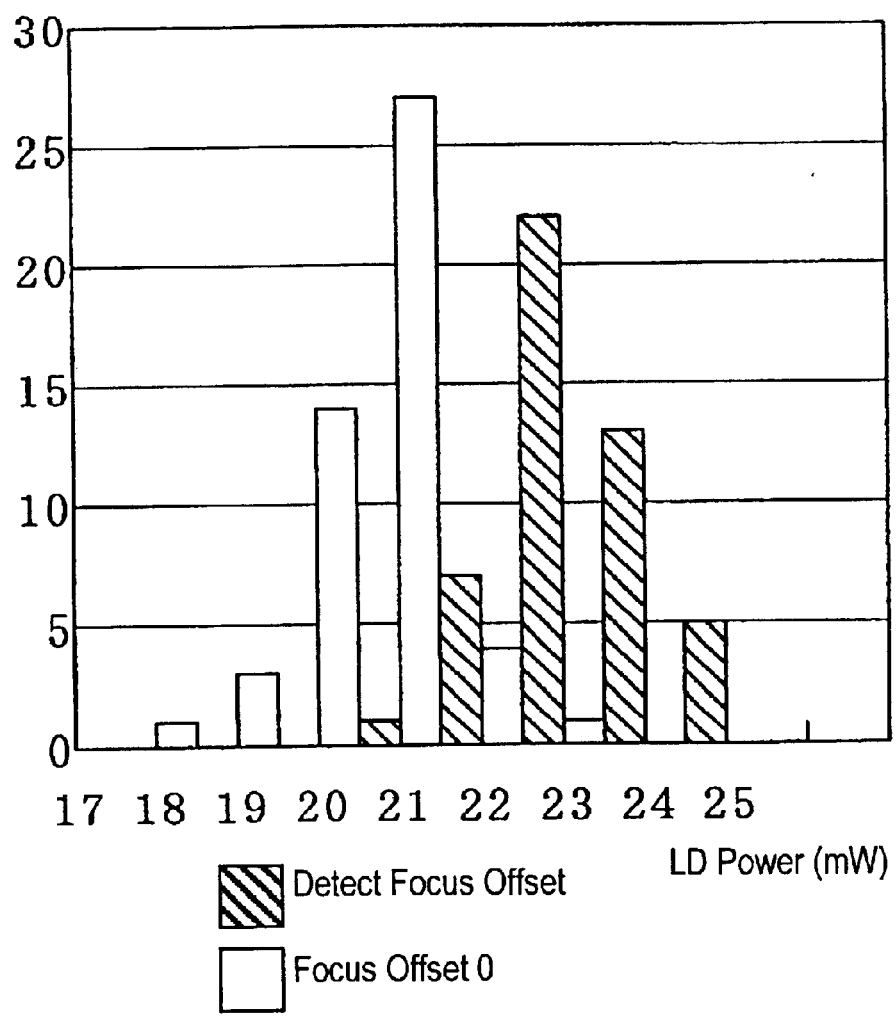
FIG. 6 is a diagram of a LD power distribution in an OPC operation of the optical disk drive according to embodiment 1.

In each of the optical disk drive in embodiment 1 and the conventional optical disk drive, the OPC was executed for plural CD-R medium in order to obtain the optimum LD power. FIG. 6 is a distribution diagram of the LD power values according to the OPC for the optical disk drives. That is, FIG. 6 represents the number of the drives against the values of the LD power with respect to respective cases: where the optical disk drive in embodiment 1 detects a focus offset with a predetermined LD power before the execution of the OPC, and detects the optimum LD power by executing the OPC with the detected focus offset; and where the conventional optical disk drive detects the optimum LD power by executing the OPC with a focus offset set to zero without detecting the optimum focus offset.

As shown in FIG. 6, the optimum LD power is statistically lower in the case where the OPC is detected after the optimum focus offset is detected than in the case where the OPC is executed without detecting the optimum focus offset. Thus, the optimum LD power for the optical disk is lowered through detecting the focus offset and executing the OPC with the detected focus offset, and the optimum LD power is thereby obtained.

As described above, the optical disk drive in embodiment 1 records the pre-test data while changing the focus offset gradually with the LD power kept in constant before executing the OPC for recording data on the write-once CD-R media. The drive detects the focus offset that minimizes the asymmetry value of the read signal after recording the pre-test data and executes the OPC with the detected focus offset, and thereby detects the optimum LD power. This lowers the required LD power required. For the re-writable CD-RW media, the drive records the pre-test data while changing the focus offset gradually with the LD power kept in constant before executing the OPC for recording data. The drive detects the focus offset that maximizes the amplitude of the read signal after recording the data and executes the OPC with the detected focus offset, and thereby detects the optimum LD power. This lowers the required LD power.

Thus, the optical disk drive according to the present invention brings about advantages as follows. The optical disk drive, since including an offset detector which detects a focus offset that minimizes an asymmetry value of a read signal and thus detects an optimum LD power for recording, prevents the LD power from increasing due to a focal misalignment in an optical axis direction, and lowers the LD power required for recording.

The optical disk drive, in addition to the above advantage, can keep the optimum LD power lower by executing an OPC with the detected optimum focus offset detected by the offset detector than the drive executing the OPC with a focus offset fixed to zero or without the focal misalignment.

The optical disk drive, in addition to the above advantages, can record pre-test data and OPC test data in a single trial write area, thus requires no large area for the trial write, and accordingly keeps a large area for actual recording.

The optical disk drive, in addition to the above advantages, can execute stable servo control in the optical axis direction.

What is claimed is:

1. An optical disk drive comprising:
   an offset controller for changing a focus offset of laser in a direction of an optical axis to a focal point on an optical disk;
   a pre-test data recorder for recording pre-test data in a trial write area provided on the optical disk with the laser having a power kept in constant while the focus offset is changed by said offset controller;
   an offset detector for detecting a focus offset that minimizes an asymmetry value of a read signal of the pre-test data;
   a power controller for recording an Optimum Power Control (OPC) test data in the trial write area while changing the power of the laser; and
   an OPC operator for determining an optimum power of the laser in accordance with an asymmetry value of a read signal of the OPC test data.

2. The optical disk drive of claim 1, wherein the asymmetry value is calculated by equations:

$$\{-(T'-U')/(T'+U')\} \times 100(\%)$$

$$T'=T-Tref;\ \text{and}$$

$$U'=U-Uref,$$

where T is a top level of the read signal, and Tref is a reference level of the top level, and where U is a bottom level of the read signal, and Uref is a reference level of the bottom level.

3. The optical disk drive of claim 1, wherein said OPC operator adjusts the focal point of the laser according to the focus offset detected by said offset detector.

4. The optical disk drive of claim 1,
   wherein said pre-test data recorder records the pretest data in a single-trial write area in the trial write area, and
   wherein said power controller records the OPC test data in the single-trial write area.

5. The optical disk drive of claim 1, further comprising:
   a focus error signal detector for detecting the focus offset as a focus error signal,
   wherein the focus offset changed by said offset controller ranges in a focus offset corresponding to −50% to +50% of an amplitude of the focus error signal.

6. An optical disk drive, comprising:
   an offset controller for changing a focus offset of laser in a direction of an optical axis to a focal point on an optical disk;
   a pre-test data recorder for recording pre-test data in a trial write area provided on the optical disk with the laser having a power kept in constant while the focus offset is changed by said offset controller;
   an offset detector for detecting a focus offset that maximizes an amplitude of a read signal of the pre-test data;
   a power controller for recording an Optimum Power Control (OPC) test data in the trial write area while changing the power of the laser; and an OPC operator for determining an optimum power of the laser in accordance with the amplitude of the read signal of the OPC test data.

7. The optical disk drive of claim 6, wherein said OPC operator adjusts the focal point of the laser according to the focus offset detected by said offset detector.

8. The optical disk drive of claim 6,
wherein said pre-test data recorder records the pre-test data in a single-trial write in the trial write area, and
wherein said power controller records the OPC test data in the single-trial write area.

9. The optical disk drive of claim 6, further comprising:
a focus error signal detector for detecting the focus offset as a focus error signal,
wherein the focus offset changed by said offset controller ranges in a focus offset corresponding to −50% to +50% of an amplitude of the focus error signal.

* * * * *